UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

LIGNO TANNING MATERIAL AND PROCESS OF PRODUCING THE SAME FROM WASTE SULFITE LIQUOR, &c.

1,303,176. Specification of Letters Patent. Patented May 6, 1919.

No Drawing. Application filed June 15, 1914. Serial No. 845,143.

*To all whom it may concern:*

Be it known that I, VIGGO DREWSEN, a citizen of the United States, and resident of the borough of Brooklyn, county of Kings, city and State of New York, have made a certain new and useful Invention Relating to Ligno Tanning Material and Processes of Producing the Same From Waste Sulfite Liquor, &c., of which the following is a specification.

This invention relates especially to a ligno-tanning material fairly soluble in warm water and having valuable tanning properties on leather, etc. which can be prepared from the waste liquor from the sulfite or soda processes of making paper from wood, etc., the lignin in these waste liquors being preferably first precipitated and largely or substantially freed from inorganic material and then being dissolved as in mono-sulfite of soda or the like from which solution it may be precipitated possibly in the form of ligno-sulfonic acid material which is separated and can be dried to powdered form to produce such ligno-tanning material which is usually a yellowish powder representing some thirty per cent. or so of the dry weight of the organic matter in waste sulfite liquor, for instance.

When starting with waste sulfite liquor it may be conveniently subjected to an alkali conversion treatment by the addition of two to six per cent. more or less of caustic soda, caustic lime or a suitable mixture thereof, and boiling at high temperature under a pressure of 100 pounds to the square inch or so in a suitable digester for several hours while simultaneously agitating by stirrers in the digester or the like. This alkali treatment apparently converts the original lignosulfite compounds and the lignin is largely converted into insoluble form and is preferably still more completely precipitated by subjecting the converted material to carbondioxid treatment. Carbon-dioxid may be percolated through the mixture of converted material in a suitable digester or other container under 50 pounds or so pressure until substantial absorption ceases and a large proportion of the woody material is precipitated in the form of lignin which may be separated by filtration from the other material. Somewhat similar results can be secured by taking the waste or black liquor from the soda process of making wood pulp and subjecting it to a generally similar carbonating treatment by which carbonic acid is percolated therethrough to render the lignin and so forth insoluble in a generally similar way. It is, however, understood that lignin material preferably in relatively pure precipitated condition may be derived from other materials for use in connection with this process and be subjected to substantially the following treatment to prepare this water soluble ligno-tanning material.

The precipitated lignin thus secured from the sulfite waste liquor for instance may be heated in a digester at about 100 pounds or so pressure for several hours or until the lignin goes into solution probably as a monosulfite compound, in a solution of mono-sulfite of soda, that is, sodium sulfite, $NA_2SO_3$, or similarly acting soluble mono-sulfites such as potassium or magnesium mono-sulfites, all of which are referred to as alkaline metal soluble mono-sulfites. The inorganic material, such as lime salts, etc., are unacted on and may be removed from the solution by decantation, filtration, etc. The dissolved lignin material, preferably after being concentrated to the desired extent in the hot solution, although preferably not concentrated to such extent as to precipitate from the solution, may then be converted by the addition of an amount of strong or concentrated sulfuric acid which is sufficient to combine with the soda in the dissolved lignin material to form sodium sulfate soluble in water solution. This precipitates out the ligno-tanning material which is difficultly soluble in such concentrated solution in which the dissolved salt is also present in amounts sufficient to aid this precipitating action, so that this ligno-tanning material which is apparently in ligno sulfonic acid form in whole or in part, is precipitated in a pitchy amorphous condition when the solution is hot, this material melting with more heat and solidifying, but on further drying turning into the form of powder of a yellowish brownish color. This ligno-tanning material may be rendered practically ash free by leaching with a small quantity of cold water to remove the soda salts, etc., and may then be dried for convenient transportation and is readily soluble in warm water so as to form a permanent solution which can be conveniently used as an effective tanning material for making leather.

This invention has been described in connection with a number of illustrative materials, proportions, arrangements and orders of steps, to the details of which disclosure the invention is not of course to be limited, since what is claimed as new and what is desired to be secured by Letters Patent is set forth in the appended claims:

1. The process of forming ligno-tanning material from waste sulfite liquor, which consists in boiling the waste liquor with two to six per cent. of caustic soda alkali at about one hundred pounds pressure for several hours to effect an alkali conversion treatment, in treating the converted material by percolating carbon-dioxid therethrough under pressure to substantial saturation and precipitating ligneous material, in dissolving the lignin material by boiling under about one hundred pounds pressure in a solution of mono-sulfite of soda and separating precipitated inorganic and other material and concentrating the dissolved lignin material, in adding strong sulfuric acid to effect the formation and precipitation of the ligno-sulfonic acid material and other ligno-tanning material.

2. The process of forming ligno-tanning material from waste sulfite liquor which consists in effecting an alkali conversion of the liquor, in treating the converted material with carbon-dioxid to substantial saturation and precipitating ligneous material therefrom, in dissolving the lignin material in a solution of mono-sulfite of soda and concentrating the dissolved lignin material and in adding sulfuric acid to effect the formation and precipitation of the ligno-tanning material which is in pitchy amorphous condition when the solution is hot.

3. The process of forming ligno-tanning material from waste liquor from paper manufacture which has been subjected to an alkali treatment which consists in precipitating ligneous material therefrom by treatment with carbon-dioxid under pressure to substantial saturation, in dissolving the ligneous material by boiling under about one hundred pounds pressure in a solution of soluble mono-sulfite of soda and separating undissolved inorganic and other material and concentrating the dissolved ligneous material, in adding sulfuric acid to effect the formation and precipitation of the ligno sulfonic acid material and other ligno-tanning material in pitchy amorphous condition when the solution is hot and in removing water from the precipitate to form a yellowish powder readily soluble in hot water.

4. The process of forming ligno-tanning material from waste liquor from paper manufacture which has been subjected to an alkali treatment which consists in precipitating ligneous material therefrom by treatment with carbon-dioxid under pressure, in dissolving the ligneous material by boiling under pressure in a solution of soluble mono-sulfite of soda and separating undissolved inorganic and other material and concentrating the dissolved ligneous material, in adding sulfuric acid to effect the formation and precipitation of the ligno-sulfonic acid material and other ligno-tanning material and in removing water from the precipitate to form a yellowish powder readily soluble in hot water.

5. The process of forming ligno-tanning material from waste liquor from paper manufacture which has been subjected to an alkali treatment which consists in precipitating ligneous material therefrom, in dissolving the ligneous material in a solution of soluble mono-sulfite of soda and separating undissolved inorganic and other material and concentrating the dissolved ligneous material, in adding sulfuric acid to effect the formation and precipitation of the ligno-tanning material and in removing water from the precipitate to form a yellowish powder readily soluble in hot water.

6. The process of forming ligno-tanning material from waste liquor from paper manufacture which has been subjected to an alkali conversion treatment which consists in precipitating lignin material therefrom by treatment with carbon-dioxid under pressure to substantial saturation, in dissolving the lignin material in a solution of soluble mono-sulfite of soda and separating undissolved inorganic and other material, in adding to the solution sulfuric acid to effect the formation and precipitation of the ligno sulfonic acid material and other ligno-tanning material which is in pitchy amorphous condition when the solution is hot and in removing water from the precipitate to form a yellowish powder readily soluble in hot water.

7. The process of forming ligno-tanning material from waste liquor from paper manufacture which has been subjected to an alkali conversion treatment which consists in precipitating lignin material therefrom by treatment with carbon-dioxid under pressure to substantial saturation, in dissolving the lignin material in a solution of soluble alkaline metal mono-sulfite and separating undissolved inorganic and other material, in adding to the solution sulfuric acid to effect the formation and precipitation of the ligno-tanning material which is in pitchy amorphous condition when the solution is hot.

8. The ligno-tanning material in the form of a yellowish powder when dried and readily soluble in warm water to form an effective tanning liquor for leather, which may be formed by dissolving the precipitated lignin material from waste cellulose liquor converted by alkali in mono-sulfite of soda and clearing and concentrating the solution and adding sulfuric acid to form and precipitate the ligno-tanning material.

9. The ligno-tanning material in the form of a yellowish powder when dried and readily soluble in warm water to form an effective tanning liquor for leather, which may be formed by dissolving lignin material in mono-sulfite of soda and adding sulfuric acid to form and precipitate the ligno-tanning material.

10. The ligno-tanning material in the form of a substantially neutral yellowish powder when dried and which is readily soluble in warm water to form an effective tanning liquor for leather and which comprises lignin material and combined sulfur organic compounds and which may be formed by dissolving woody lignin material from waste cellulose liquor in mono-sulfite of soda and adding sulfuric acid to form and precipitate the ligno-tanning material.

VIGGO DREWSEN.

Witnesses:
HARRY L. DUNCAN,
JESSIE B. RAY.